(12) United States Patent
Bruck et al.

(10) Patent No.: US 9,527,165 B2
(45) Date of Patent: Dec. 27, 2016

(54) POWDER DEPOSITION PROCESS UTILIZING VIBRATORY MECHANICAL ENERGY

(71) Applicant: SIEMENS ENERGY, INC., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 58 days.

(21) Appl. No.: 14/614,621

(22) Filed: Feb. 5, 2015

(65) Prior Publication Data

US 2016/0228990 A1    Aug. 11, 2016

(51) Int. Cl.
*C08J 7/18* (2006.01)
*B05D 3/00* (2006.01)
*B22F 3/105* (2006.01)

(52) U.S. Cl.
CPC ............. *B23K 26/70* (2015.10); *B22F 3/1055* (2013.01); *B23K 26/342* (2015.10)

(58) Field of Classification Search
CPC ...... B22F 3/1055; B23K 26/34; B23K 26/342; C23C 24/08; C23C 24/10; C23C 24/103; C23C 24/106
See application file for complete search history.

(56) References Cited

U.S. PATENT DOCUMENTS

| | | | |
|---|---|---|---|
| 4,644,127 A | 2/1987 | Rocca | |
| 4,674,332 A | 6/1987 | Pace et al. | |
| 5,914,059 A | 6/1999 | Marcin, Jr. et al. | |
| 6,157,591 A | 12/2000 | Krantz | |
| 6,743,740 B2 | 6/2004 | Brask | |
| 2009/0151147 A1* | 6/2009 | Bialas | B23K 26/16 29/557 |
| 2011/0287185 A1* | 11/2011 | Felstead | B22F 3/105 427/277 |
| 2012/0143043 A1 | 6/2012 | Peyman | |
| 2012/0223462 A1* | 9/2012 | Eriksson | B22F 3/1055 264/497 |
| 2013/0136868 A1* | 5/2013 | Bruck | B05D 3/06 427/554 |
| 2013/0190595 A1 | 7/2013 | Oraevsky et al. | |
| 2014/0255620 A1* | 9/2014 | Shuck | B05D 3/12 427/560 |

OTHER PUBLICATIONS

Oztec Standard Rebar Shaker, http://www.oztec.com/standard_rebar_shaker.htm, pp. 1-2.

* cited by examiner

*Primary Examiner* — Michael Wieczorek

(57) ABSTRACT

A method for depositing clad material (24) onto a substrate (10) by melting a layer of powdered material (16) using an energy beam (20), and also applying vibratory mechanical energy (27, 29 and/or 31). The vibratory mechanical energy may be applied before, during or after the melting and solidification of the powdered material in order to preheat the powder, to distribute powder over a top surface (18) of the substrate, to control the formation of dendrites in the clad material as the melt pool (22) solidifies, to remove slag, and/or to perform stress relief. Simultaneous application of beam energy and vibratory mechanical energy facilitates the continuous deposition of the clad material, including directionally solidified material.

19 Claims, 1 Drawing Sheet

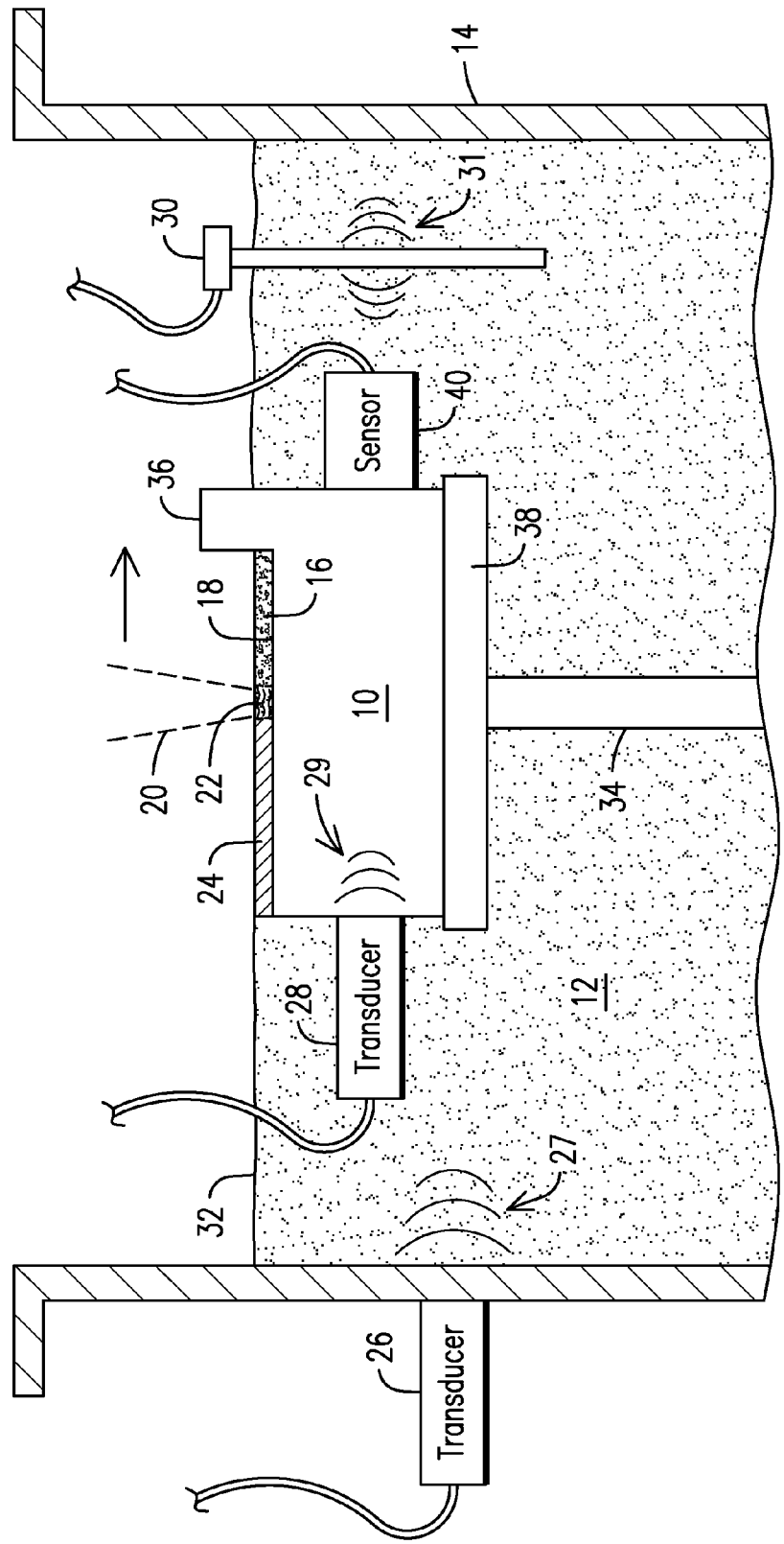

POWDER DEPOSITION PROCESS UTILIZING VIBRATORY MECHANICAL ENERGY

FIELD OF THE INVENTION

This invention relates generally to the field of materials technology, and more particularly to processes for depositing a cladding material by melting a powdered material on a substrate surface with an energy beam.

BACKGROUND OF THE INVENTION

Selective laser melting (SLM) and electron beam melting (EBM) are known additive manufacturing processes whereby a powdered feed material is melted and fused into a homogeneous mass by the application of an energy beam in a layer-by-layer process for forming a three dimensional object. These processes are useful for creating intricate shapes by melting small filler material particles (e.g. 20-100 microns) with a small diameter beam at focus (e.g. 50 microns) with precise computer controlled movement of the beam. However, these processes tend to be slow and expensive, and they produce only small grain sized equiaxed and polycrystalline microstructures. Moreover, they are limited to depositing material onto a top surface of a component where the component does not project above the processing plane, since the powder is typically applied to the processing plane by a wiper action which spreads the feed material across the processing plane. Accordingly, improved powder deposition processes are needed.

BRIEF DESCRIPTION OF THE DRAWINGS

The invention is explained in the following description in view of the sole drawing that shows an embodiment of an improved selective laser melting process.

DETAILED DESCRIPTION OF THE INVENTION

The present inventors have developed an improved process for depositing a powdered feed material onto a substrate surface which overcomes many of the limitations of prior art SLM and EBM processes. In addition to the application of heat energy with an energy beam as is provided in known processes, the present invention advantageously incorporates the use of vibratory mechanical energy. The vibratory mechanical energy may be applied to the powder and/or to the substrate before, during and/or after the application of the beam energy in various embodiments of the invention, as described more fully below.

The sole FIGURE illustrates aspects of the invention. A substrate material 10 is supported in a bed of powdered material 12 within a container 14. A layer 16 of the powdered material is distributed over a surface 18 of the substrate 10, and is being melted by an energy beam 20 being traversed over the surface 18 in the direction of the arrow. The melted powder forms a traveling melt pool 22 which then cools and solidifies to form a layer of clad material 24 on the substrate 10. The energy beam may be a light beam, a laser beam, a particle beam, a charged-particle beam, an electron beam, a molecular beam, etc. The powdered material is typically a metal alloy, but may include ceramic, flux, plastic, glass, composite, and/or other powdered ingredients and mixtures thereof.

In one embodiment, the layer 16 of the powdered material is distributed over the surface 18 by vibratory mechanical energy applied to the bed of powdered material 12. The vibratory mechanical energy 27 may be imparted to the bed of powdered material 12 by an electro-mechanical transducer 26 in contact with a surface the container 14. Alternatively, a similar transducer 28 may be used in direct contact with the substrate 10 to apply the energy 29, or a pencil head shaker 30 may be submerged into the bed of powdered material 12 to apply the energy 31. The vibratory mechanical energy functions to loosen or "fluidize" the bed of powdered material 12 and to cause it to form a horizontally level upper surface 32. The height of the support structure 34 for the substrate 10 may be adjusted or the quantity of the powdered material within the container 14 may be controlled such that the level upper surface 32 of the bed of powdered material 12 forms a desired thickness for layer 16 over the substrate surface 18.

The vibratory mechanical energy may be applied at a single frequency or over a range of frequencies, including from low frequencies (e.g. 50 Hz or less) to ultrasonic frequencies (above 18 kHz). The use of vibratory mechanical energy to move powder onto the processing plane advantageously eliminates the need for a wiper arm as is commonly provided in prior art SLM machines. This makes it possible to apply clad material 24 onto a substrate 10 having a portion 36 which extends above the working plane of the surface 18 being coated.

The vibratory mechanical energy may be provided intermittently or continuously as desired to achieve a desired distribution of the powdered material over the surface 18. Continuous powder delivery has the potential for significantly increasing the speed of the deposition process by allowing the powder delivery and melting to proceed concurrently. Moreover, directional solidification of the deposited clad material 24 is now possible by continuously feeding and melting material over a broad area, such as by applying heat energy with a diode laser or by rapidly scanning a high power laser beam. The application of vibratory mechanical energy to the bed of powdered material 12 will result in some preheating of the powder, in particular if ultrasonic energy is used, thereby reducing an amount of heat that must be applied via the beam 20 in order to achieve melting. A chill plate 38 may be utilized to influence the direction of heat transfer from the melt pool 22 in order to facilitate the directional solidification of the clad material 24, including the deposition of single crystal material. The chill plate may further incorporate sides (e.g. of zirconia) extending above its surface that laterally insulate the deposit made thereon. By discouraging lateral heat conduction, these insulating features would further enhance uniaxial heat extraction and ensure directional solidification.

The vibratory mechanical energy may be applied as the weld pool 22 material solidifies in a manner effective to break up dendrites that may be forming during the solidification, thereby providing grain refinement and improved mechanical properties to the deposited clad material 24. Effective vibration frequencies may vary depending upon the alloy of the substrate 10. For example, magnesium alloys have been cited to benefit from frequencies up to about 16 Hz while steels have been cited to benefit from frequencies up to about 400 Hz. Furthermore, a component may benefit from application of resonant frequencies that are dependent on its specific geometry. To this end, a vibration sensor(s) 40 may be useful in detecting such resonances and thereby providing feedback to adjust vibrator speeds that optimize vibrational effect.

The vibratory mechanical energy may be applied after the clad material 24 is solidified in a manner effective to introduce stress relief. For example, large amplitudes of vibration that induce stresses approaching the fatigue limit of the material being processed can effect significant relief of residual stresses.

In embodiments where the clad material 24 includes a difficult to weld superalloy material, the layer of powdered material 16 may include a powdered flux material, as described in commonly owned United States patent application publication number US 2013/0136868 A1, incorporated by reference herein. The melted flux material will form an uppermost layer of slag material as part of the deposited clad material 24, and the slag material must most normally be removed prior to the deposition of the next layer of clad material. In such embodiments, vibratory mechanical energy may be applied in a manner effective to release the slag from the substrate 10 by mechanically breaking the layer of slag and loosening it from the underlying deposited superalloy material. Frequencies effective in achieving such detachment are likely similar to those common in mechanical tools such as chipping hammers and needle guns (e.g. up to hundreds on Hz) but may beneficially extend up to up to the kilohertz range.

While the vibratory mechanical energy may be applied to the powder and/or to the substrate before, during and/or after the application of the beam energy, it need not be applied in the same manner, at the same frequency, or from the same location during these different phases of the deposition process. For example, preheating of the powder may be accomplished with ultrasonic energy applied by the pencil head shaker 30 until a desired powder temperature is achieved, then movement of the powder may be further stimulated by the application of vibratory mechanical energy at a lower frequency applied by the transducer 26, and then still lower frequency vibratory mechanical energy may be applied by transducer 28 during and/or after the melting and solidification steps. Standing or moving waves may be induced in the bed of powdered material 12 or the substrate 10 in order to accomplish movement of powder, control of dendrite formation, slag removal and/or stress relief. The process and powder bed may or may not be further assisted by fluidizing gas, inert cover gas or general process space vacuum.

In a further embodiment, powdered material 12 may include at least two distinct types of particles, such as different size particles, different shaped particles, different density particles, etc. The vibratory mechanical energy may be controlled to preferentially react with one type of particle in favor of another type of particle, such as using different frequencies of vibratory mechanical energy to preferentially heat particles of metal alloy more than particles of flux material. In another example, metallic alloy and ceramic particles may be moved onto substrate surface 18 by using multiple frequencies of mechanical vibratory energy simultaneously; then the different types of particles may be segregated into respective layers on the surface 18 by further vibratory mechanical energy of a single frequency which promotes the "floating" of the ceramic above the metallic alloy. Similarly, relatively smaller particles may be induced to migrate into cracks or openings in the surface 18 while relatively larger particles are retained on the surface 18.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process comprising:
   distributing a powdered material over a surface of a substrate;
   applying vibratory mechanical energy to the powdered material in contact with the substrate or to the substrate in a manner to preheat the powdered material;
   melting the powdered material with an energy beam; and
   allowing the melted material to solidify on the substrate.

2. The process of claim 1, wherein the powdered material is distributed over the surface via the vibratory mechanical energy.

3. The process of claim 1, wherein the powdered material is distributed over the surface in a continuous manner via the vibratory mechanical energy and the steps of melting and allowing to solidify are conducted continuously.

4. The process of claim 1, wherein the vibratory mechanical energy is applied to the melted material as it solidifies in a manner effective to break dendrites forming during the solidification.

5. The process of claim 1, wherein upon solidification of the material, the vibratory mechanical energy is applied to the solidified material on the substrate in a manner effective to introduce stress relief.

6. The process of claim 1, wherein the powdered material comprises a flux material which forms a slag on the substrate, and further comprising applying the vibratory mechanical energy in a manner effective to release the slag from the substrate.

7. The process of claim 1, wherein the vibratory mechanical energy exhibits a frequency in a range selected from one of: up to 16 Hz; up to 400 Hz; and above 18 kHz.

8. A process wherein layers of powdered material are distributed, via application of mechanical vibrational energy, over a surface of a substrate, preheated via application of mechanical vibrational energy to the powdered material in contact with the substrate or to the substrate, and melted by an energy beam to deposit respective layers of clad material on the substrate.

9. The process of claim 8, wherein the mechanical vibrational energy is further applied to the powdered material during the melting of the powdered material over the surface.

10. The process of claim 8, wherein the mechanical vibrational energy is imparted to the substrate.

11. The process of claim 8, wherein the mechanical vibrational energy is imparted to a bed of the powder material adjacent the substrate.

12. The process of claim 11, wherein the mechanical vibrational energy is imparted to the bed of powdered material by a probe immersed into the bed of powder material.

13. The process of claim 11, wherein the mechanical vibrational energy is imparted to the bed of powdered material by vibrating a container of the bed of powder material.

14. The process of claim 8, wherein the distribution of the powdered material and the melting by the energy beam are conducted simultaneously such that the layers of clad material are deposited on the substrate in a continuous manner.

15. The process of claim 14, further comprising controlling heat flow from melted material as it re-solidifies to form the clad material such that the clad material comprises a directionally solidified material.

16. A process wherein a powdered material is preheated with a vibratory mechanical energy and melted with a laser beam and the vibratory mechanical energy and then allowed to solidify to form a deposit on a substrate.

17. The process of claim 16, further characterized by distributing the powdered material over the substrate via the vibratory mechanical energy prior to melting the powdered material.

18. The process of claim 16, further characterized by applying the vibratory mechanical energy as the melted material is allowed to solidify.

19. The process of claim 16, further characterized by distributing the powdered material over the substrate in a continuous manner by applying the vibratory mechanical energy during the step of melting such that the deposit is formed in a continuous manner.

* * * * *